United States Patent [19]

Franzen

[11] Patent Number: 4,674,607
[45] Date of Patent: Jun. 23, 1987

[54] SHOCK ABSORBING DEVICE WITH INTEGRAL PRESSURE RELIEF VALVE

[75] Inventor: Robert L. Franzen, Bellevue, Wash.

[73] Assignee: The United States of America as represented by the Secretary of the Air Force, Washington, D.C.

[21] Appl. No.: 801,341

[22] Filed: Nov. 25, 1985

[51] Int. Cl.⁴ ............................................. F16F 9/34
[52] U.S. Cl. .................... 188/282; 137/493;
 188/280; 188/312; 188/317; 188/322.15;
 267/127
[58] Field of Search .................. 188/282, 317, 322.15,
 188/322.22, 320, 280, 316, 312; 267/127;
 137/493

[56] References Cited

U.S. PATENT DOCUMENTS

| 2,521,202 | 9/1950 | Cloudsley | 188/282 |
| 2,655,935 | 10/1953 | Kinzbach | 137/538 |
| 2,717,058 | 9/1955 | Brundrett | 188/322.15 X |
| 3,100,502 | 8/1963 | Ford et al. | 137/491 |
| 3,350,087 | 10/1967 | Haanes | 188/316 X |
| 4,335,744 | 6/1982 | Bey | 137/522 |
| 4,372,545 | 2/1983 | Federspiel | 188/280 X |
| 4,610,332 | 9/1986 | Mourray | 188/282 |

FOREIGN PATENT DOCUMENTS

| 223497 | 9/1962 | Austria | 188/322.15 |
| 1228154 | 11/1966 | Fed. Rep. of Germany | 188/282 |
| 1106930 | 12/1955 | France | 188/322.15 |
| 163344 | 12/1980 | Japan | 188/282 |

Primary Examiner—George E. A. Halvosa
Attorney, Agent, or Firm—Jules J. Morris; Donald J. Singer

[57] ABSTRACT

A liquid spring shock absorbing device 8 comprising an hydraulic piston 10 with an integral surge valve 14. The hydraulic piston 10 is positioned within a fluid filled piston housing 12 and is made up of a piston body 16, a spring reaction plate 22 and a piston heat 18. A large annular spring 30 and a small annular spring 36 are positioned adjacent to the spring reaction plate 22. Short duration shocks are transmitted by the fluid to cause rotation of annular spring 36 which opens relief valve port 42. Long duration, high intensity shocks cause compression of both annular springs, opening of relief valve port 42 and movement of hydraulic piston 10.

9 Claims, 3 Drawing Figures

SHOCK ABSORBING DEVICE WITH INTEGRAL PRESSURE RELIEF VALVE

STATEMENT OF GOVERNMENT INTEREST

The invention described herein may be manufactured and used by or for the Government for governmental purposes without the payment of any royalty thereon.

TECHNICAL FIELD

This invention relates to large shock absorbing devices which are used to protect structures and machinery. The invention is particularly suited to preventing shock induced damage to machinery from ground movements, such as caused by earthquakes.

BACKGROUND OF THE INVENTION

Earthquakes and any otherwise generated ground movements can have devastating effects on structures and machinery. Since large parts of the world are susceptible to earthquakes it is unavoidable that industrial structures will occasionally be subjected to earthquakes. Certain industrial structures must therefore be effectively protected from the effects of earthquakes to avoid subsequent disasters that can be as dangerous as the original shock. Examples of facilities that must be so protected include nuclear power plants, chemical refining plants and military facilities housing armaments. At such facilities leaks of radioactive or poisonous chemicals and the possibility of explosions must be avoided.

Large shock absorbing devices have been devised which minimize the acceleration of the mass of a mechanism or housing with respect to its support or foundation. Simple shock mounts include elastic pads or insulation, massive springs and hydraulic pistons. None of these types of devices are completely satisfactory.

Elastic pads and damped springs absorb shock through movement and heating of their elastic material. Unfortunately, elastic pads and springs often overreact to step inputs and as a result can, depending on the frequency of the shocks, worsen the effect of the shocks through resonant oscillations. In many applications these resonant frequencies can be avoided, but not, however, for ground shocks which are largely unpredictable in frequency and intensity.

Hydraulic piston shock absorbers, also called dashpot or liquid springs, absorb the energy of the mass in motion by forcing fluid through restrictions as a piston is driven through fluid by the shock. Heat generated thereby is dissipated by radiation and conduction from the shock absorber. There are several difficulties with this type of device when used to absorb massive shocks. Massive shock absorber pistons respond to shocks very slowly which means that rapid shock impulses are transmitted through the shock absorber to the protected device. Hydraulic fluid pressure adjacent to the piston can also rise too rapidly as a result of piston movement. Excessively high hydraulic pressure can cause shock absorber failure through leakage and fracture. As a result, larger hydraulic pistons are equipped with pressure relief valves that bypass fluid around the piston when fluid pressure exceeds a certain level.

Relief valves must exhibit high response rates and high flow rates to be effective. The relief valves are therefore subject to problems similar to those of the shock absorber. If the pressure relief valve is tied to the piston or a stiff spring it will respond too slowly to rapid shock driven pressure rises; if the pressure relief valve is triggered by dynamic masses and springs it may overreact to step input demand and oscillate.

The unfortunate choice for both shock absorber pistons and pressure relief valves is between heavily damped devices which are slow to respond, or lightly damped devices which tend to overreact and oscillate.

This invention's objective is to overcome the above problems with a device that uses a combination of hydraulics and springs that operate differently in response to different inputs of varying intensity and duration. The objectives of this invention also include producing a device with the ability to absorb shocks and dampen the transmission of vibration over very large spectrum of possible shock inputs.

SUMMARY OF THE INVENTION

The invention is a shock absorbing device comprising an hydraulic piston liquid spring with an integral pressure modulating hydraulic valve arrangement. The pressure modulating, surge relief valve uses annular springs, commonly referred to as BELLEVILLE springs to distinguish between and advantageously respond to both short duration hydraulic pulses and longer duration hydraulic loads.

More particularly the hydraulic piston is positioned within an annular cavity and comprises an annular piston head adjacent to the interior surface of the annular cavity, an axially centered main piston body and a spring reaction plate which spans the annular gap between the piston head and the piston body.

In the preferred embodiment of the invention a large annular spring is positioned adjacent to the spring reaction plate in an annular cavity formed between the piston body and piston head. A small annular spring is positioned next to the large annular spring and is mounted to move as a rocker in relation to the large annular spring. Short duration hydraulic pulses result in rocking movement of the small annular spring to open an hydraulic pressure relief port. Long duration hydraulic pulses result in movement of both annular springs and the piston, in addition to causing the opening of hydraulic pressure relief ports.

The relative movement of the annular springs and the piston head controls the opening of valve ports that allow fluid to bypass the hydraulic piston to relieve hydraulic pressure buildup across the piston. Varying pressure load intensity and longevity will result in the opening or the partial metered opening of the valve ports regardless of whether the shock is sufficient to move the piston body. Fluid compressibility, piston head movement and fluid movement through valving orifices (viscous damping) result in appropriate damping of shock produced hydraulic loads and thus minimal transmission of shock effects to protected devices.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being place upon illustrating the principles of the invention.

DETAILED DESCRIPTION OF THE INVENTION

Figure 1:
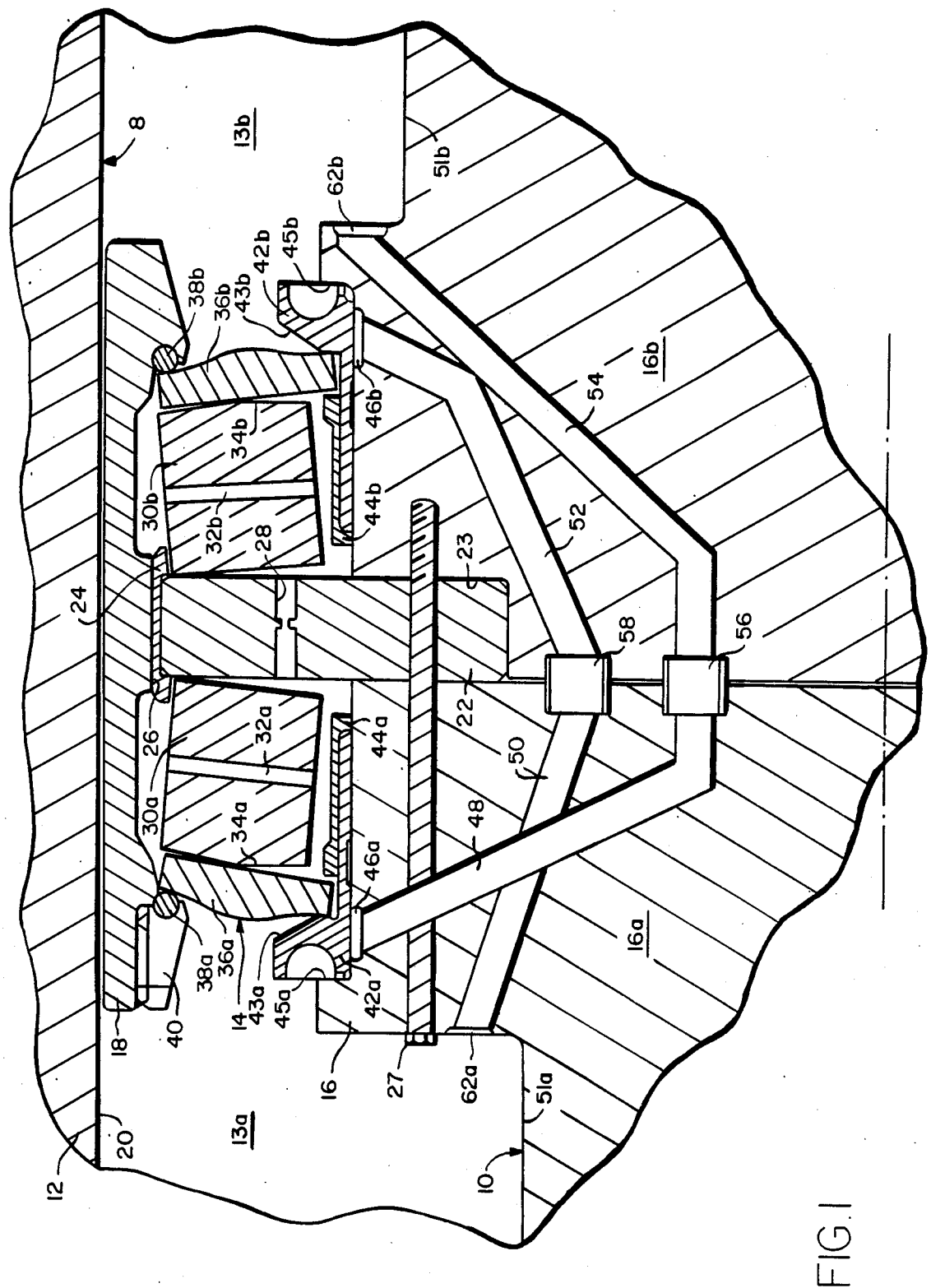
FIG. 1 is an axial cross-section of part of the hydraulic piston of the shock absorbing device, showing the piston and the surge relief valve at rest.

The invention comprises an hydraulic shock absorbing liquid spring 8 in which a piston 10 is positioned inside a piston housing 12. The piston housing 12 encloses an hydraulic fluid filled cavity having conventional ends and seals (not shown) through which extend piston rods 51a and 51b. Generally, the liquid spring shock absorber 8 is designed for isolating large machinery or structures from ground shocks, or earthquakes. The protected structure or device is typically mounted to an axial end of piston 10 of the liquid spring while the housing is mounted to ground, however, a reverse installation will also work acceptably. The shock absorbing liquid spring which is filled with an hydraulic fluid, converts the shock energy into heat through movement of the piston 10 (relative to the housing) which both compresses hydraulic fluid and forces it through fixed and variable valves and orifices.

Figure 2:
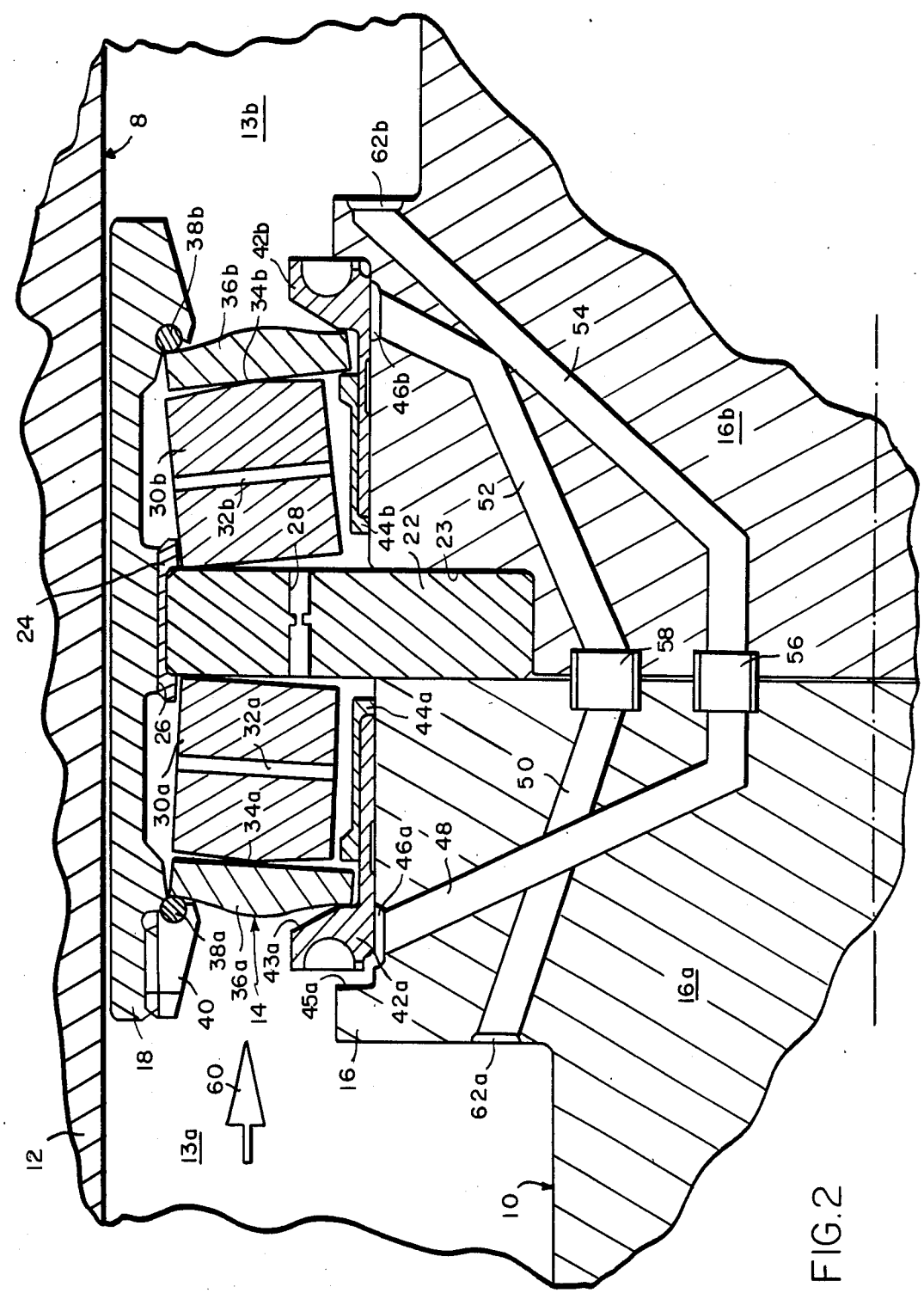
FIG. 2 is an axial cross-section of the shock absorbing device of FIG. 1, showing the piston and relief valve responding to a shock induced rapid pressure surge condition.
Figure 3:
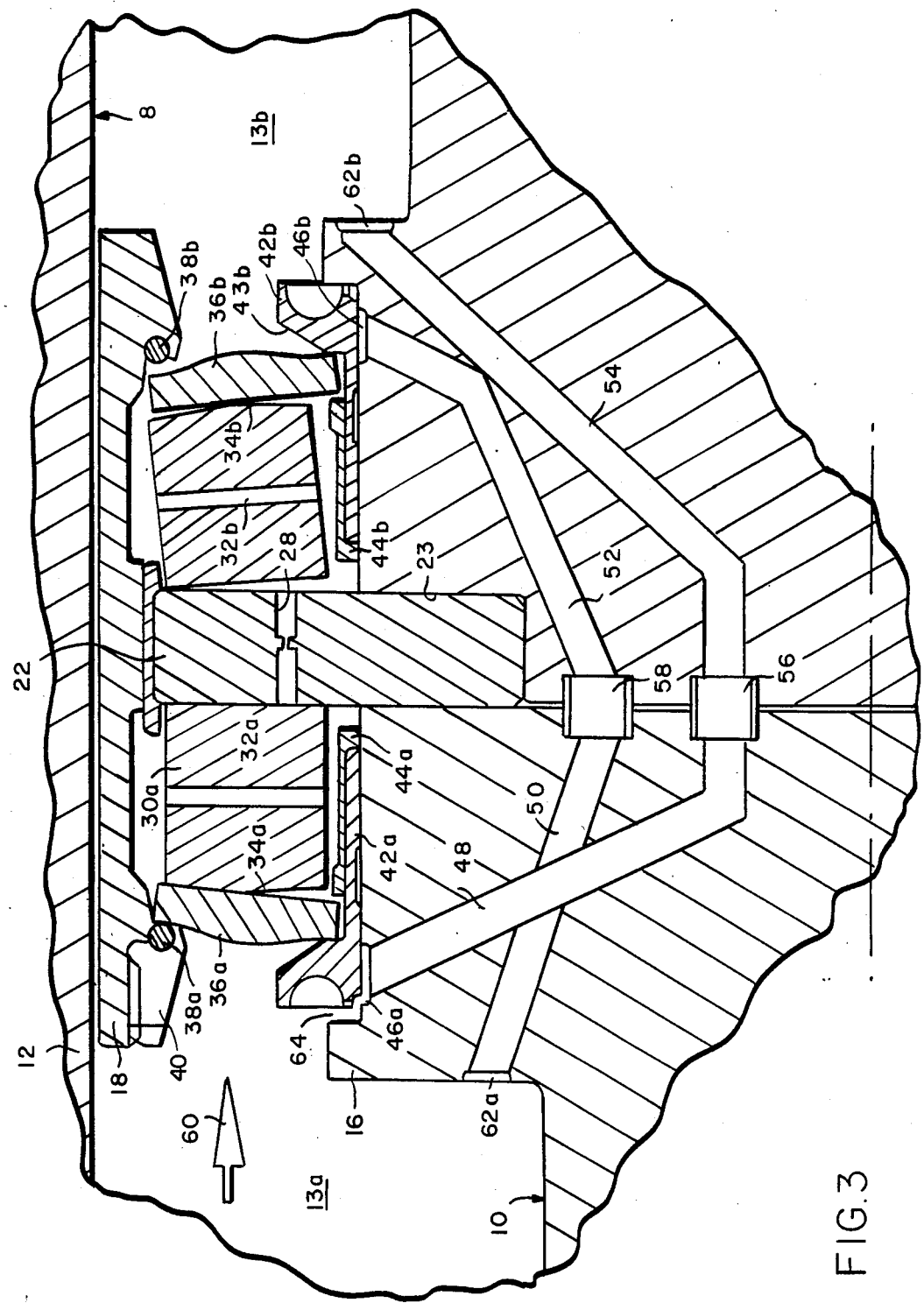
FIG. 3 is an axial cross-section of the shock absorbing device of FIG. 1, showing the piston and relief valve responding to a prolonged shock induced pressure increase.

The piston 10 comprises a piston body 16, a piston head 18, and an annular spring reaction plate 22 which spans the annular gap between the piston body and piston head. In most uses the piston will be nominally centered within the cavity 13 enabling the piston 10 to stroke in both directions with alternating higher and lower pressure loads. Integral with the piston 10 is a valve assembly 14 which is capable of differentiating between shocks of varying intensity and duration, and responding differently to them. The surge relief valve 14 shown in FIGS. 1-3 is a double acting valve that can respond to pressure shocks from either side of the piston 10.

Since the valve and spring mechanisms comprising the surge relief valve 14 are identical on both sides of piston 10, repeated elements are referred to by reference numerals with the subscript 'a' when they appear on the left side of the piston and with the subscript 'b' when they appear on the right side of the piston. If no subscripts are used with a numeral for duplicate elements, both elements are referred to.

The piston 10 and its associated relief valve 14 are shown in FIG. 1 in their at rest position (i.e., they are not responding to any shocks). Valve 14 is integral with the piston 10 and is placed in an annular space between the piston body 16 and the hydraulic piston head 18. The hydraulic piston moves axially with respect to interior wall 20 of piston housing 12.

The piston body is assembled from halves 16a and 16b which capture the spring reaction plate 22 therebetween at recess 23. The left and right halves of the piston body are held together by a circle of bolts 27. The spring reaction plate extends from the recess 23 in the piston body to a spring guide 24 which is positioned against surface 26 of the piston head 18. The reaction plate also comprises a series of fluid orifices 28 which serves to absorb shock energy through the passage of fluid and to help equalize hydraulic fluid pressure between the right and left sides of the hydraulic cavity 13. The spring guide 24 is preferably constructed of beryllium copper and is cut axially in one radial location to facilitate assembly. A small orifice may thus be created by a controlled width cut and accounted for with the other orifices when considering fluid flow. The spring guide 24 is restrained from axial movexent by the reaction plate 22.

On either side of reaction plate 22 are positioned large annular springs 30, which resemble spring washers but are larger. These annular springs are commonly known as BELLEVILLE springs. The large annular springs 30 have one or more oil flow orifices 32 through their neutral axis which allow hydraulic fluid to flow to reaction plate orifices 28. The large annular springs 30 are configured with bevelled surfaces, or fulcrums, 34 upon which are positioned smaller annular springs 36. The smaller annular springs are aligned to act as rockers on the bevelled surfaces 34 of large annular springs 30. The combined rocker and lower rate annular springs 36 pivot on the large annular spring 30 when responding to pressure forces.

The annular springs locate radially outward against the spring guide 24 and piston head 18. Possible guide radial load is therefore transmitted directly to the piston head 18. The annular springs are retained within their annular recess at their outer most diameter by the piston head 18 at pivot wires 38 and by the spring guide 24. Pivot wire 38a adjacent to small annular spring 36a is preferably incorporated in a threaded nut 40 which is threaded onto the piston head 18 in order to accommodate assembly and provide for shimming of the pivot to pivot dimension (38a to 38b) as required for annular spring preloading. Pivot wire 38b is press fitted directly into piston head 18. The pivot wires are preferably constructed of chrome silicon spring wire which has been heat treated for hardness.

At their inner diameter the small annular springs 36 are retained in position adjacent to valve pistons 42 by the spring preloading. The smaller annular rockers 36 are locked between the pivot wires 38 and the fulcrums 34 on the larger annular springs 30. The large annular springs 30 are, in turn, trapped between the small annular springs 36 and the spring reaction plate 22.

Valve pistons 42a and 42b are free to move axially between reaction plate 22 and piston flanges 45a and 45b, save for the force applied on them by the annular springs 36 at flanges 43 and spring guides 44. Valve piston 42a moves axially to cover and uncover a valve port 46a. Similarly valve piston 42b controls whether valve port 46b is opened or closed. Porting between opposite faces of the piston 10 is accomplished by means of passages 48, 50, 52 and 54. Passages 48 and 54 are joined at the interface of the right 16a and left 16b piston halves by crush tubing 56 and discharge at exit port 62b. Similarly passages 50 and 52 are joined by crush tubing 58 and discharge at exit port 62a. Any low level leakage from the passages or the valves is permissible since zero leakage is not required across the hydraulic piston assembly 10 because pressure is equal on both sides of the piston at rest.

The piston 10 is initially preset in its desired position when the hydraulic piston housing 12 is initially filled with fluid. Piston rod 51a has a smaller diameter then piston rod 51b, therefore, as more fluid is added to the fluid filled piston cavity 13 the piston will be driven rightward to increase fluid cavity capacity. Generally sufficient fluid will be added to the housing to drive piston 10 to a central preset condition in between stops (not shown) at the ends of the cylinder housing 12.

In the view of FIG. 1 both valve pistons 42 are in place over their respective ports 46 and are at rest. Operation of the valve may be readily understood with reference to FIGS. 2 and 3.

FIG. 2 is a cross-sectional view of the piston and valve assembly of FIG. 1 wherein the piston and valve are responding to a momentary surge in hydraulic pressure as would be caused by a momentary high pressure increase from the direction shown by arrow 60. The arrow 60 indicates the net axial flow component of the fluid mass with respect to the liquid spring piston 10. As shown in FIG. 2 the step increase in fluid pressure at the annular spring cavity 13a has caused the small annular spring rocker 36a to pivot on surface 34a and rotate counter clockwise. The differential movement of the rocker allows valve piston 42a to move axially and uncover valve port 46a. High pressure fluid will therefore flow through port 46a and tubes 48 and 54 until it is discharged at exit port 62b. This movement of the fluid serves to absorb shock wave energy and equalize pressure across the piston 10. Fluid also flows from the annular spring cavity 13a and through orifices 28. Damping therefore is a result of movement of hydraulic fluid through the above mentioned orifices (viscous damping) and of fluid compressability which dampens valve piston and annular spring movement.

Under step input conditions such as shown in FIG. 2 the piston body 16 may or may not move since it has a much higher mass and inertia then the pressure relief valve. The lower inertia piston head 18 may, however, move independently but is constrained in its movement by the annular springs. Differential movement of the piston head 18 increases the damping action of the liquid spring 8. The rocker annular spring 36 and the valve piston 42 are much more likely to move then the piston 16 or piston head 18 due to their relatively low inertia.

FIG. 3 illustrates how the liquid spring and surge valve react to a longer duration increase in pressure applied from the direction of arrow 60. A longer duration pressure wave will move (rightward) the piston body 16 and piston head 18 within the piston housing 12. Additionally, large annular spring 30a and small annular spring 36a will be compressed against spring reaction plate 22. Compression of the annular springs allows the pressurized fluid to drive valve piston 42a away from port 46a. Fluid passage will therefore occur between the high pressure side 13a and the low pressure side 13b of the piston 10. The fluid travels through the valve port 46a, passages 48 and 54, and out through valve exit port 62.

As the piston assembly moves, piston head 18 may move further in the same direction, due to its lower inertia compared to the piston body 16, resulting in clockwise rotation of small annular spring 36a. Clockwise rotation of the small annular spring 36a during a sustained pressure shock which restrains valve piston 42a movement at flange 43a reduces the size of the passage 64 to port 46a and meters the flow of fluid therethrough. This prevents too large a fluid flow from by-passing the piston and reducing piston fluid damping.

The energy of the fluid mass in motion is therefore converted to heat by forcing the fluid through the surge valve 14, orifices 28, 32 and other leakage routes. Other damping is caused by fluid compression which dampens movement of the hydraulic piston body 16, the piston head 18, valve pistons 42 and the annular springs. The heat of damping is dissipated by conduction from the shock absorbing device.

Both FIGS. 2 and 3 illustrate functioning of the valve in response to a compression load which produces a higher pressure in cavity 13a relative to cavity 13b. Annular springs 30b, 36b and valve piston 42b operate in a similar manner to that described above in reference to a compression load, when they are subjected to an extension load stemming from an increase in hydraulic pressure in cavity 13b relative to cavity 13a. Although the two sides of the valve are shown in equal size in the sectional FIGS. 1-3 they can be of different size depending on damping requirements. In some instances a surge valve may not even be required for extension strokes, since such damping may not be necessary.

One of the novel features of this design is found in the ability of the piston and valve arrangement to discriminate between and respond appropriately to both sudden hydraulic pulses and longer duration high pressure loads. Although this liquid spring shock absorber provides very substantial damping in response to large loads, the valve system reacts quickly to abrupt changes of fluid pressure without oscillation. The quick controlled response provided primarily by rocker annular 36 and the novel valving scheme is not normally available in conventional one or two stage valves systems without incurring the risk of valve instability and oscillation. The slower high spring rate response to sustained shocks is provided by movement of the larger annular 30 and the piston 10 while valving is metered by differential movement of the piston head. In all instances transfer of fluid across orifices and fluid compressibility are utilized as damping factors and the exact response of the system varies between the two above described load situations in a gradual and appropriate manner that combines both approaches during variations in loading. In both load situations the high rate annular springs minimize pressure pulsation effects and the tendency toward valve oscillation. Further, the rocker motion of the smaller annular spring minimizes any frictional effects that might otherwise result in oscillation or vibratory pulsation.

The design of this device can be easily changed to suit a variety of uses and conditions. Damping can be modified unidirectionally by varying the size of reaction plate orifices or by varying fluid passage sizes through the belleville spring 30a and 30b individually. Specific operational parameters can also be adjusted either theoretically or empirically by matching the differential surface areas of the piston (at cavities 13a, 13b), by changing the spring rates of the annular springs or by varying the strokes of the belleville springs.

The liquid spring shock absorber described herein is adaptable to a variety of mounting positions but is preferably vertically mounted in a high impact enviroment and is normally maintained in at ready, or standby, mode. The device is capable of withstanding 5,000 to 10,000 cycles of varying amplitudes depending on the vibration and shock environment.

While the invention has been particularly described with reference to a preferred embodiment thereof, it will be understood by those skilled in the art that various changes in substance and form may be made therein without having departed from the spirit and scope of the invention as detailed in the attached claims:

I claim:

1. An hydraulic shock absorbing device incorporating a pressure relief valve comprising:

(a) an hydraulic piston housing enclosing an hydraulic fluid filled cavity; and
(b) a moveable hydraulic piston enclosed in said hydraulic piston housing, comprising:
  (i) a moveable piston body centrally located within said hydraulic piston housing,
  (ii) a piston head, encircling said piston body within said hyraulic piston housing, said piston head capable of movement relative to said piston body,
  (iii) a pressure relief valve for controlling a fluid passage through said moveable hydraulic piston,
  (iv) an annular spring reaction plate fixedly attached to said piston body and radially interspaced between said piston body and said piston head,
  (v) a high spring rate annular spring adjacent to one side of said reaction plate, said high rate annular spring having a fulcrum on one side,
  (vi) a low spring rate annular spring adjacent to said piston head and positioned as a rocker on the fulcrum of said high rate annular spring so that momentary hydraulic pressure increases compress said low rate annular spring and initiate rotation of said low rate annular spring, said rotation allowing said pressure relief valve to open, while prolonged pressure increases substantially compress both said annular springs, displace said piston body and said piston head, and allow said pressure relief valve to open and permit fluid flow through said moveable hydraulic piston.

2. The hydraulic shock absorbing device of claim 1 wherein relative movement of the piston head during long duration pressure increases results in partial closure of said fluid passage through said hydraulic piston in order to meter the fluid flow therebetween.

3. The hydraulic shock absorbing device of claim 1 wherein said reaction plate further comprises an hydraulic fluid communicating orifice for communicating fluid across opposite sides of said piston.

4. The hydraulic shock absorbing device of claim 1 further comprising:
  a second high rate annular spring having a fulcrum adjacent to a second side of said reaction plate;
  a second low rate annular spring adjacent to said second high rate annular spring and positioned as a rocker on said fulcrum of said second high rate annular spring so that momentary pressure increases rotate and substantially compress said second low rate annular spring to allow said pressure relief valve to open while prolonged pressure increases substantially compress both said second high rate and said second low rate annular springs as well as displace said hydraulic piston to allow said pressure relief valve to open.

5. The hydraulic shock absorbing device of claim 4 wherein fluid flow in said fluid passage between opposite sides of said hydraulic piston is regulated by movement of said annular springs and said hydraulic piston to provide viscous damping of said hydraulic piston as well as reduce hydraulic pressure differences between opposite sides of said hydraulic piston.

6. The hydraulic shock absorbing device of claim 5 wherein said pressure relief valve further comprises a valve piston interspaced between said hydraulic piston body and said annular springs wherein said valve piston serves to directly meter fluid flow through said fluid passage.

7. The hydraulic shock absorbing device of claim 4 wherein said reaction plate further comprises orifices for fluid communication between opposite sides of said piston in order to provide additional viscous damping of said hydraluic piston.

8. The hydraulic shock absorbing device of claim 4 wherein said high rate annular springs further comprise fluid communicating passages therethrough.

9. An hydraulic shock absorbing device incorporating a pressure relief valve comprising:
  (a) an hydraulic piston housing enclosing an hydraulic fluid filled cavity, and
  (b) a moveable hydraulic piston enclosed in said hydraulic piston housing, said hydraullic piston comprising:
    (i) a piston body centrally located within said hydraulic piston housing,
    (ii) a piston head encircling said piston body within said hydraulic piston housing, said piston head capable of movement relative to said piston body,
    (iii) a pressure relief valve, for controlling a fluid passage through said moveable hydraulic piston,
    (iv) an annular spring reaction plate fixedly attached to said piston body and radially interspaced between said piston body and said piston head,
    (v) two high rate annular springs, each high rate annular spring having a first side with a fulcrum and a second side which is adjacent to said reaction plate, and
    (vi) two low rate annular springs, each adjacent to said piston head and positioned to rotate about one of said fulcrums of said high rate annular springs so that momentary hydraulic pressure increases cause compression and rotation of one of said low rate annular springs, the rotation allowing said pressure relief valve to open for the passage of fluid, and wherein long duration pressure increases substantially compress one of said high rate and one of said low rate annular springs, displace said piston body, said piston heads, and allow said pressure relief valve to open.

* * * * *